US012074866B2

(12) United States Patent
Matsuda

(10) Patent No.: US 12,074,866 B2
(45) Date of Patent: Aug. 27, 2024

(54) SERVER FOR TOKEN PROCESSING, CONTROL METHOD, AND STORAGE MEDIUM STORING PROGRAM THEREFOR

(71) Applicant: CANON KABUSHIKI KAISHA, Tokyo (JP)

(72) Inventor: Kotaro Matsuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 17/815,529

(22) Filed: Jul. 27, 2022

(65) Prior Publication Data

US 2023/0064523 A1 Mar. 2, 2023

(30) Foreign Application Priority Data

Aug. 16, 2021 (JP) .................................. 2021-132249

(51) Int. Cl.
*H04L 9/40* (2022.01)
*H04L 51/48* (2022.01)
*H04L 67/54* (2022.01)
*H04N 1/00* (2006.01)

(52) U.S. Cl.
CPC .......... *H04L 63/0838* (2013.01); *H04L 51/48* (2022.05); *H04L 67/54* (2022.05); *H04N 1/00212* (2013.01)

(58) Field of Classification Search
CPC ..... H04L 63/0838; H04L 51/48; H04L 67/54; H04N 1/00212; H04N 1/00244
See application file for complete search history.

(56) References Cited

U.S. PATENT DOCUMENTS

| 8,661,254 | B1 * | 2/2014 | Sama | ...................... H04L 63/18 713/168 |
| 10,484,367 | B1 * | 11/2019 | Nguyen | ............... G06F 3/04817 |
| 2014/0355034 | A1 * | 12/2014 | Mihara | .................. G06F 3/1222 358/1.14 |
| 2015/0092233 | A1 * | 4/2015 | Park | .................... H04N 1/00244 358/1.15 |
| 2018/0212948 | A1 * | 7/2018 | Hao | ........................ G06F 21/45 |
| 2021/0026936 | A1 * | 1/2021 | Zheng | ................ G07C 9/00309 |
| 2023/0344832 | A1 * | 10/2023 | Hall | ..................... H04L 63/0838 |

FOREIGN PATENT DOCUMENTS

JP 2007-328381 A 12/2007

* cited by examiner

*Primary Examiner* — Meng Vang
*Assistant Examiner* — Tania M Pena-Santana
(74) *Attorney, Agent, or Firm* — Canon U.S.A., Inc., IP Division

(57) ABSTRACT

A server that verifies a token acquired from an information processing apparatus includes at least one memory and at least one processor that executes a program stored in the memory to issue a plurality of tokens including a first token and a second token to a user, associate and manage the first token and the second token, and to invalidate, when the first token is received from the information processing apparatus, the second token managed in association with the first token.

14 Claims, 14 Drawing Sheets

FIG. 4
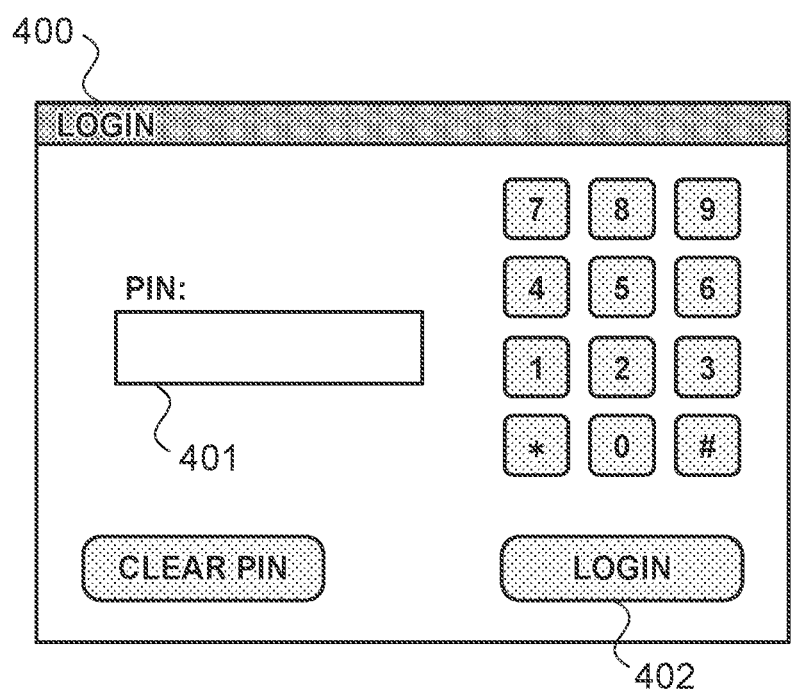
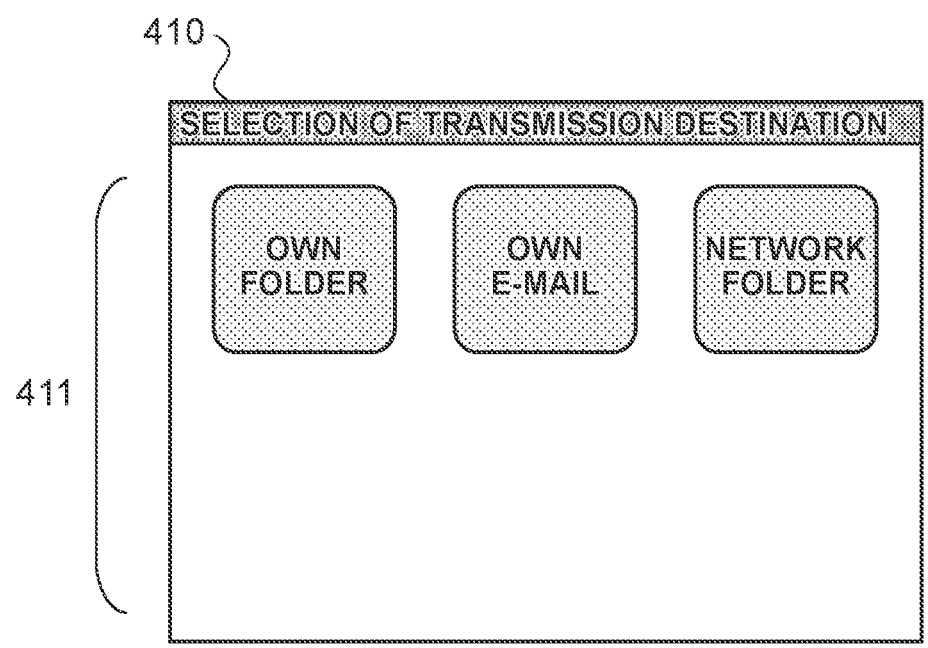

FIG. 8

| SENDER | SUBJECT | RECEPTION DATE AND TIME |
|---|---|---|
| no-reply@server.mycompany.com | SCANNED DOCUMENT JOB NOTIFICATION | 2021/6/9 13:01 |
| no-reply@server.mycompany.com | SCANNED DOCUMENT JOB NOTIFICATION | 2021/6/9 13:03 |
| no-reply@server.mycompany.com | SCANNED DOCUMENT JOB NOTIFICATION | 2021/6/9 13:12 |

800
801

810

SENDER: no-reply@server.mycompany.com
SUBJECT: SCANNED DOCUMENT JOB NOTIFICATION
RECEPTION DATE AND TIME: 2021/6/9 13:01

SCANNED DOCUMENT JOB HAS BEEN PREPARED.
PLEASE LOG IN WEB APPLICATION AND COMPLETE PROCESSING.

LOGIN URL (AVAILABLE FOR 60 MINUTES AFTER ISSUANCE)
https://server.mycompany.com/login?otp=745b4fb1a6d54b0a9370e2a8b23be7e1&redirectto=scanprocess

811

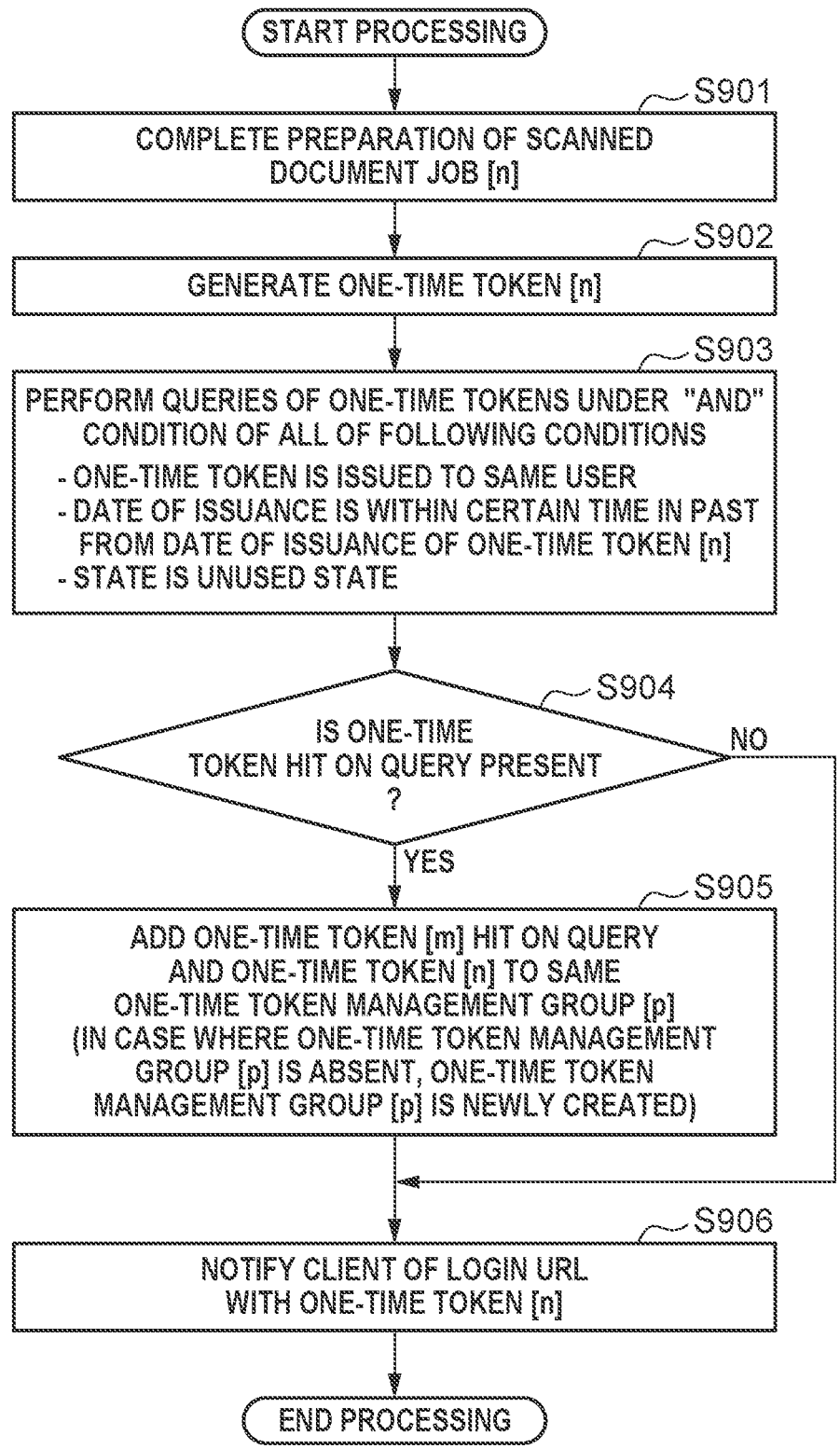

SENDER: no-reply@server.mycompany.com
SUBJECT: SCANNED DOCUMENT JOB NOTIFICATION
RECEPTION DATE AND TIME: 2021/6/10 15:30

SCANNED DOCUMENT JOB IS DELEGATED BY USER A.
PLEASE LOG IN WEB APPLICATION AND COMPLETE PROCESSING.

LOGIN URL
https://server.mycompany.com/login?redirectto=scanprocess

1301

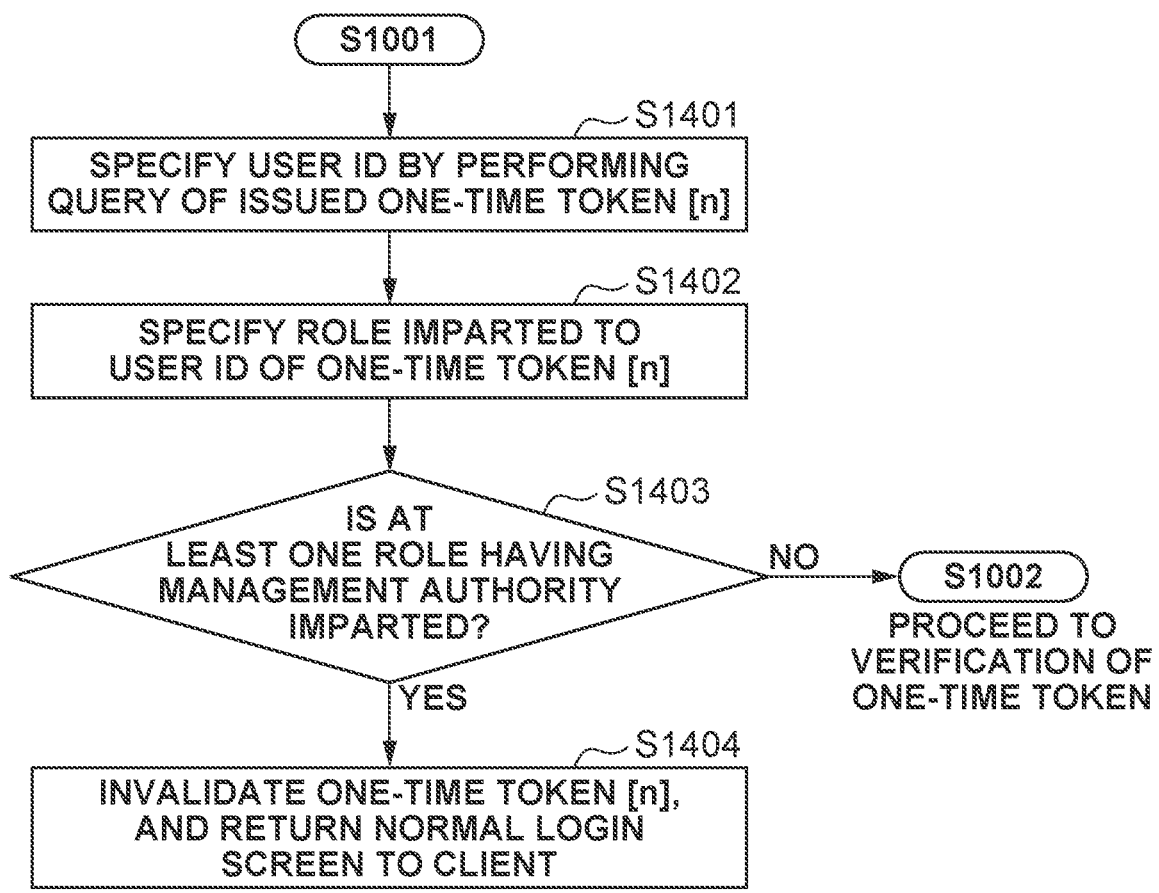

SERVER FOR TOKEN PROCESSING, CONTROL METHOD, AND STORAGE MEDIUM STORING PROGRAM THEREFOR

BACKGROUND

Field

The present disclosure relates to a server issuing a one-time token, a control method, and a storage medium storing a program therefor.

Description of the Related Art

When a user logs into a web site or a web application, a method of authenticating the user using a user identification (ID) and a password is often adopted. When a character string length of a password is short, strength of the password is weak. However, it is typically difficult for the user to memorize a long character string. To improve authentication security, there is a method of authenticating the user by issuing a one-time password as an additional authentication element other than the password.

Japanese Patent Application Laid-Open No. 2007-328381 discusses a technique in which a one-time password is issued to a user, and when it is confirmed that the one-time password matches a one-time password input by the user, the one-time password is invalidated as a used one-time password. Generally, to protect security, the one-time password is a random number, a random character string, or the like, and has a short expiration period. When the one-time password is used once, the used one-time password is not reusable. The issued one-time password is provided to the user by electronic mail (e-mail) or the like. Other methods of providing the one-time password include short message service (SMS) to a mobile phone number, token software for a smartphone, etc.

In the technique discussed in Japanese Patent Application Laid-Open No. 2007-328381, the one-time password is provided to the user by an e-mail with a user action for settlement processing as a trigger.

Depending on a work performed by the web application, a plurality of times of user action may continuously occur. Therefore, according to the technique discussed in Japanese Patent Application Laid-Open No. 2007-328381, a plurality of one-time passwords is issued to the user in a short time. When one of the plurality of issued one-time passwords is used, the used one-time password is invalidated as a "used" one-time password. However, unused one-time passwords from among the plurality of issued one-time passwords remain in an unused state. Although the expiration period of each one-time password is set short, the plurality of valid one-time passwords is present within the expiration period. Therefore, risks such as unauthorized login due to theft and leakage of the one-time password remain.

Previously issued one-time passwords can be invalidated every time a one-time password is issued. However, it is not possible to know which of the plurality of issued one-time passwords the user uses. When the user tries to log into a service using one of the plurality of issued one-time passwords, the user may not be able to log into the service because that one-time password is invalid.

SUMMARY

The present disclosure is directed to a technique where, in a case where a plurality of one-time passwords is issued, the remaining unused one-time passwords are invalidated to maintain a security level without deteriorating convenience.

According to an aspect of the present disclosure, a server configured to verify a token acquired from an information processing apparatus, the server comprising at least one memory and at least one processor that executes a program stored in the memory to issue a plurality of tokens including a first token and a second token to a user, associate and manage the first token and the second token, and invalidate, when the first token is received from the information processing apparatus, the second token managed in association with the first token.

Further features will become apparent from the following description of exemplary embodiments with reference to the attached drawings.

BRIEF DESCRIPTION OF THE DRAWINGS

FIG. 4 is a first diagram illustrating a scan application user interface (UI).

FIG. 8 is a first diagram illustrating a notification method.

FIG. 9 is a flowchart illustrating one-time token generation processing.

FIG. 13 is a second diagram illustrating the notification method.

FIG. 14 is a flowchart illustrating role determination processing.

DESCRIPTION OF THE EMBODIMENTS

Exemplary embodiments will be described below with reference to drawings. The following exemplary embodiments are not seen to be limiting, and combinations of features or functions described in the exemplary embodiments are not essential for implementing the exemplary embodiments.

Figure 1:
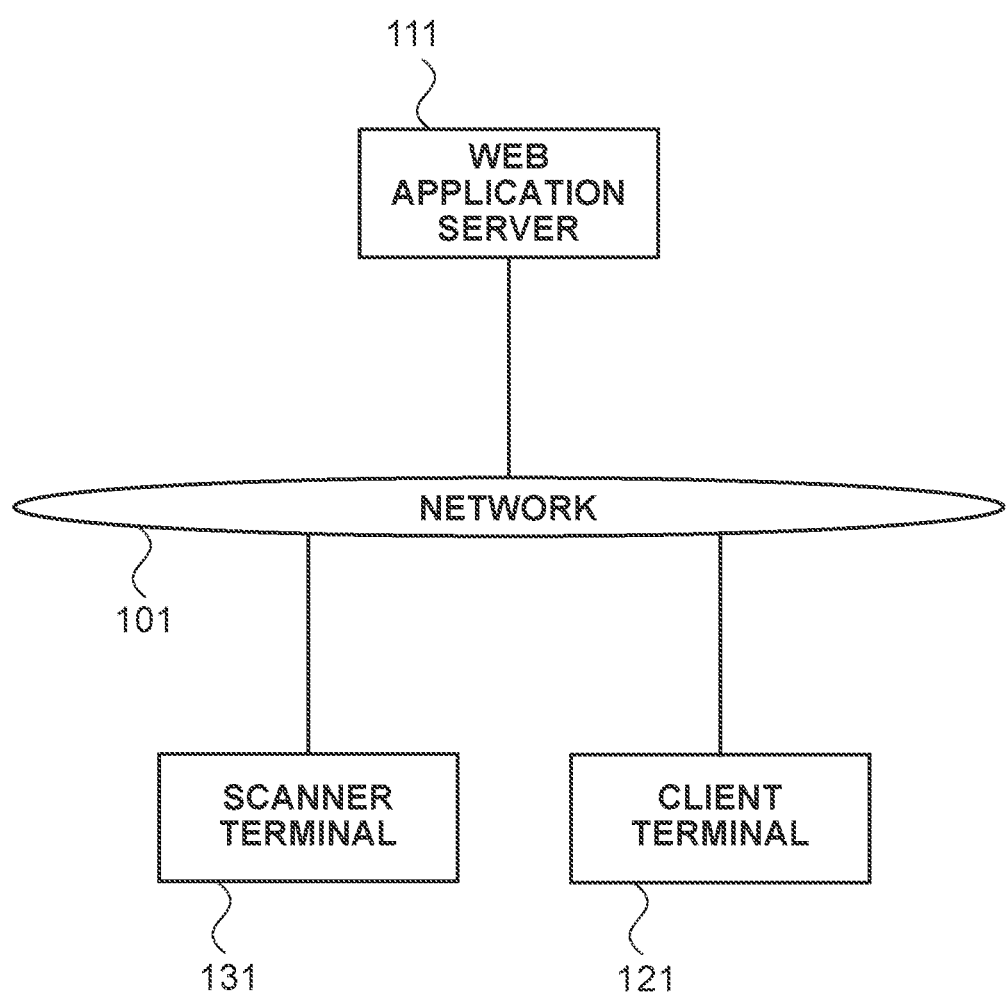
FIG. 1 illustrates a system configuration according to exemplary embodiments.

A first exemplary embodiment will be now be described. FIG. 1 illustrates a system configuration according to exemplary embodiments. The system includes a network 101 such as the Internet or an intranet, a web application server 111, and a client terminal 121, which is an information processing apparatus such as a personal computer, a laptop computer, a tablet computer, or a smartphone. The system also includes a scanner terminal 131, which is a device including a scan function such as, for example, a multifunctional peripheral that includes copy, print, scan functions or a scanner that includes a single scan function. These example of a scanner terminal 131 are not seen to be limiting.

Figure 2:
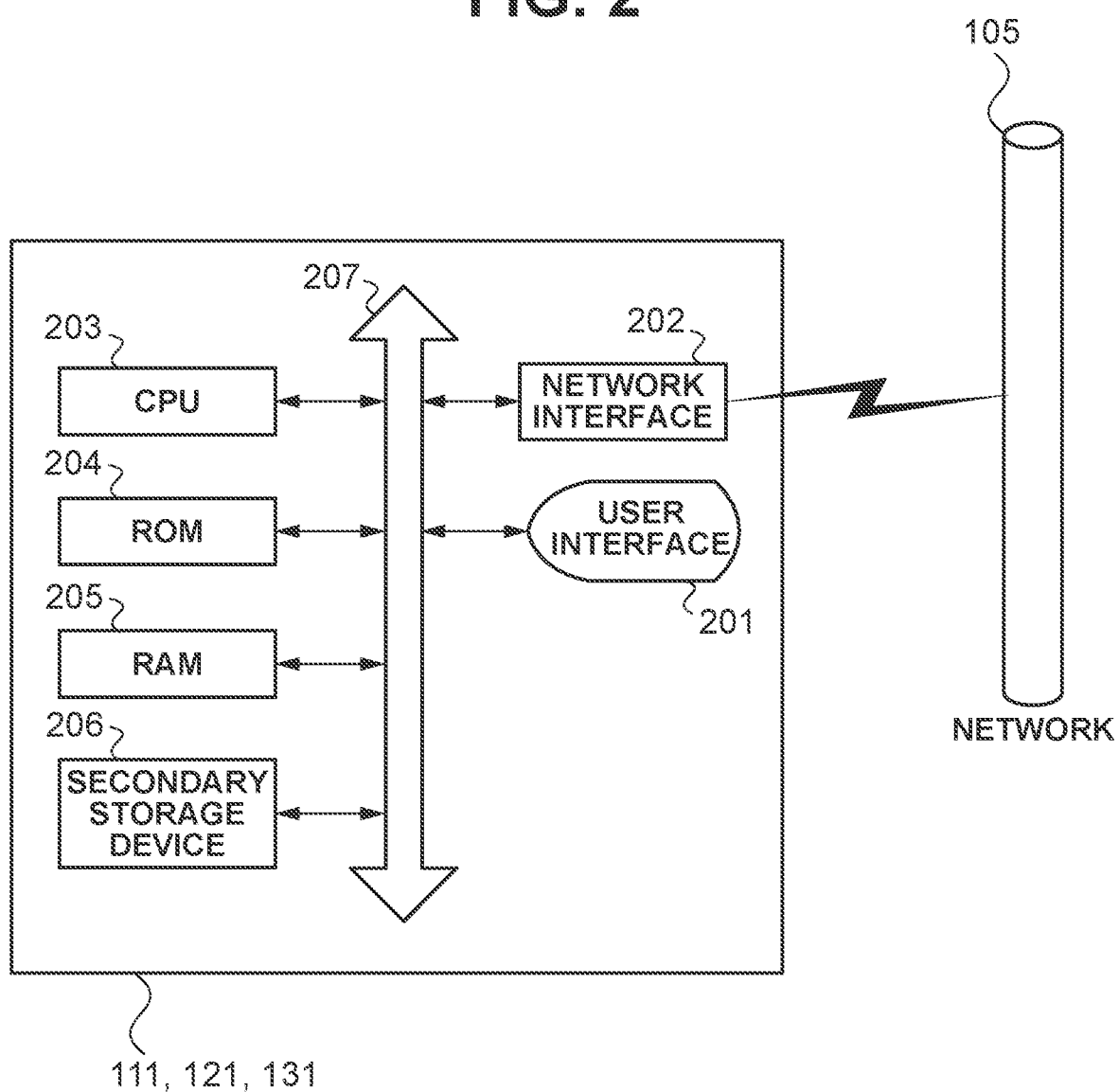
FIG. 2 is a hardware configuration diagram according to exemplary embodiments.

FIG. 2 is a hardware configuration diagram of each of the web application server 111, the client terminal 121, and the scanner terminal 131 according to exemplary embodiments. A network interface 202 is connected to a network 105, such as a local area network (LAN), and communicates with other computers and network apparatuses via the network 105. The communication can be performed via a wired or wireless method. A read only memory (ROM) 204 stores programs and data. A random access memory (RAM) 205 is used as a temporary memory area. A secondary memory device 206 is, for example, a hard disk drive (HDD) or a flash memory. A central processing unit (CPU) 203 executes programs read from the ROM 204, the RAM 205, the secondary memory device 206, and the like. A user interface 201 performs input/output of information and signals via a display, a keyboard, a mouse, buttons, a touch panel, and the like. The above-described elements are connected via a bus 207.

Figure 3:
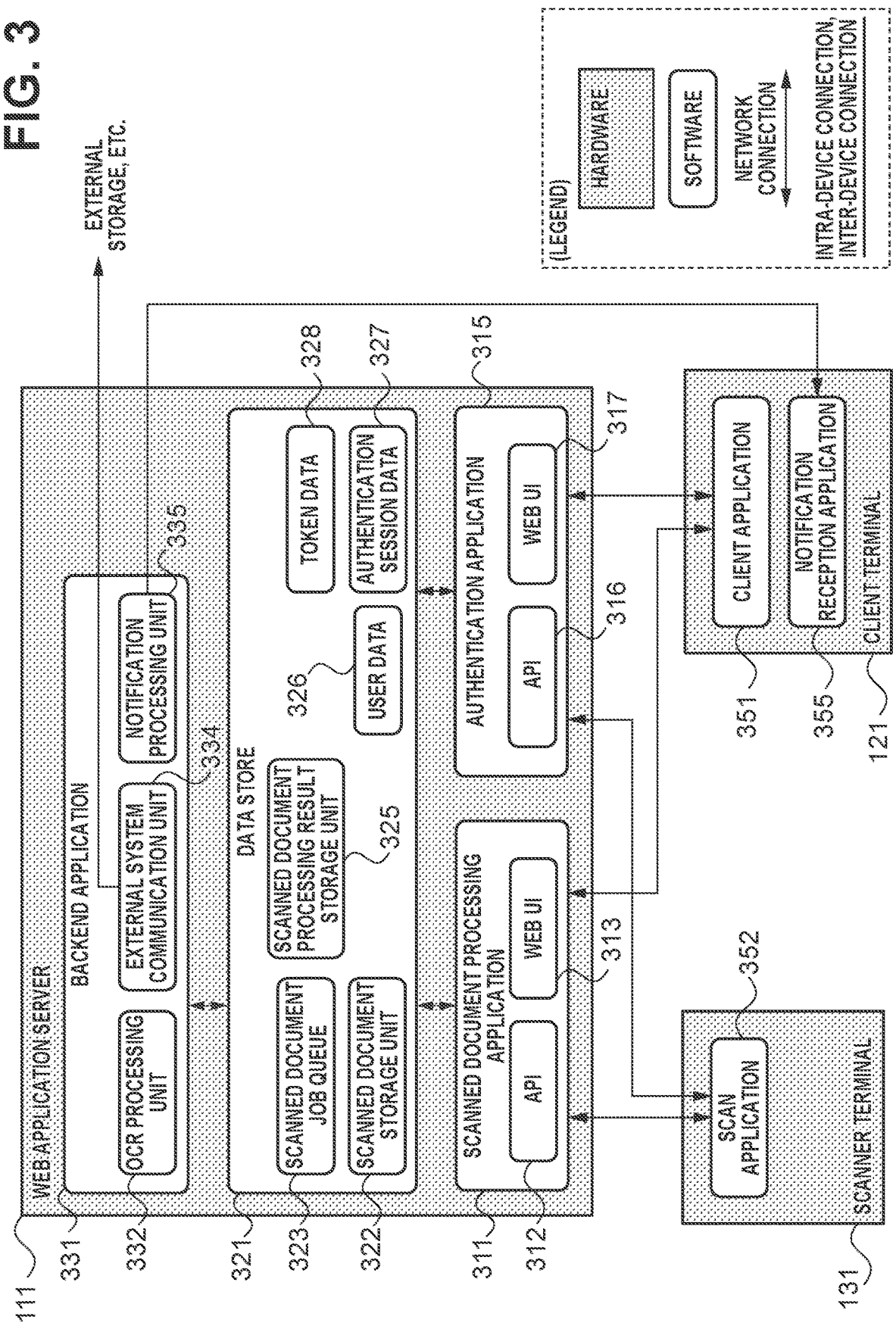
FIG. 3 is a diagram illustrating a software and hardware configuration according to exemplary embodiments.

FIG. 3 is a diagram illustrating a software and hardware configuration according to exemplary embodiments. The installed software is executed by the CPU 203, and the interaction between different software is illustrated by arrows. A scanned document processing application 311 is installed in the web application server 111 and provides an application programming interface (API) 312 and a web user interface (UI) 313.

An authentication application 315 is installed in the web application server 111. The authentication application 315 includes an API 316 and a web UI 317. Both the web UIs 313 and 317 include Hyper Text Markup Language (HTML), JavaScript, and Cascading Style Sheets (CSS) complying with Hyper Text Transfer Protocol (HTTP) standard. Both the APIs 312 and 316 processes a data input/output request from a client, as a representational state transfer (RESTful) API complying with the HTTP standard.

A data store 321 stores data used by the scanned document processing application 311, the authentication application 315, and a backend application 331 described below. A scanned document storage unit 322 stores a file of a scanned document as an image file such as a Joint Photographic Experts Group (JPEG) image file or a document file such as a Portable Document Format (PDF) file. A scanned document job queue 323 stores a queue to manage a scanned document job waiting for input processing described below. A scanned document processing result storage unit 325 stores a result of optical character recognition (OCR) processing. The scanned document processing result storage unit 325 stores OCR area information used for each scanned document, an input character string value, and the like.

User data 326 manages information about a user who can access the web application server 111. The user data 326 stores and manages, for example, a user identification (ID), authentication credentials such as a password and a personal identification number (PIN), a contact e-mail address, and a role of the user. When a state of scan data is a preparation completion state, an e-mail providing a uniform resource locator (URL, access destination) of a scanned document job list UI is transmitted to the client terminal 121, where the e-mail address is used as a transmission destination.

Authentication session data 327 stores and manages an authentication session issued when the user authentication via the authentication application 315 is successful. Token data 328 stores and manages a one-time token described below. In the present exemplary embodiment, the description is provided based on the web application server 111 managing all of the above-described data. In another exemplary embodiment, a plurality of apparatuses can manage the data.

A backend application 331 performs the below-described asynchronous background processing. An OCR processing unit 332 acquires an input image from the scanned document storage unit 322, and performs OCR processing. In the OCR processing, a starting point coordinate, a width, and a height of an area recognized as a character string image, and a recognized OCR result character string are extracted. An external system communication unit 334 transmits the scanned document and the processing result to an external storage or the like. In an exemplary embodiment where it is unnecessary to externally transmit the scanned document and the processing result, the external system communication unit 334 can be omitted. A notification processing unit 335 transmits a notification to the client terminal 121.

In the present exemplary embodiment, a client application 351 is installed in the client terminal 121. When the client application 351 calls various types of APIs released by the web application server 111, the functions of the various types of web applications stored by the web application server 111 can be used. More specifically, the web UIs 313 and 317 are displayed on a browser, and necessary data is transmitted to and received from the APIs 312 and 316 to execute the web application. Alternatively, an application for a computer or a smartphone that transmits and receives the necessary data to and from the APIs 312 and 316 can be used. When starting access to the web application server 111, the client application 351 first performs user authentication by inputting the authentication credentials and the like via the authentication application 315. The authentication application 315 verifies the input authentication credentials with reference to the user data 326. When the verification is successful, the authentication application 315 creates a new session in the authentication session data 327, and stores information on the authentication session. The authentication application 315 returns a response including the authentication session to the client application 351. As a result, the user is logged into the web application server 111. After the login is successful, the client application 351 can access the web UI 313 and the API 312 of the scanned document processing application 311, and the user can perform scanned document processing work. The details of the scanned document processing work will be described below with reference to FIG. 4 to FIG. 7. In the present exemplary embodiment, an e-mail client is used as a notification reception application 355. As described above, the notification method can be the SMS or other applications.

A scan application 352 is installed in the scanner terminal 131. The scan application 352 reads a paper document via a scanner unit, generates scan data (image file), and transmits the scan data to the scanned document processing application 311. The scan application 352 also performs user authentication via the authentication application 315 in a manner similar to the client application 351, and as such, description of the contents of the authentication processing will be omitted herein. In a case where the scanner terminal 131 is unable to display a scan application UI, the scanner terminal 131 can be separately connected to the client terminal 121 via a universal serial bus (USB), Wi-Fi®, or the like, and the client terminal 121 can execute the scan application 352.

Contents of the scanned document processing work will now be described with reference to FIG. 4 to FIG. 7.

Figure 5:
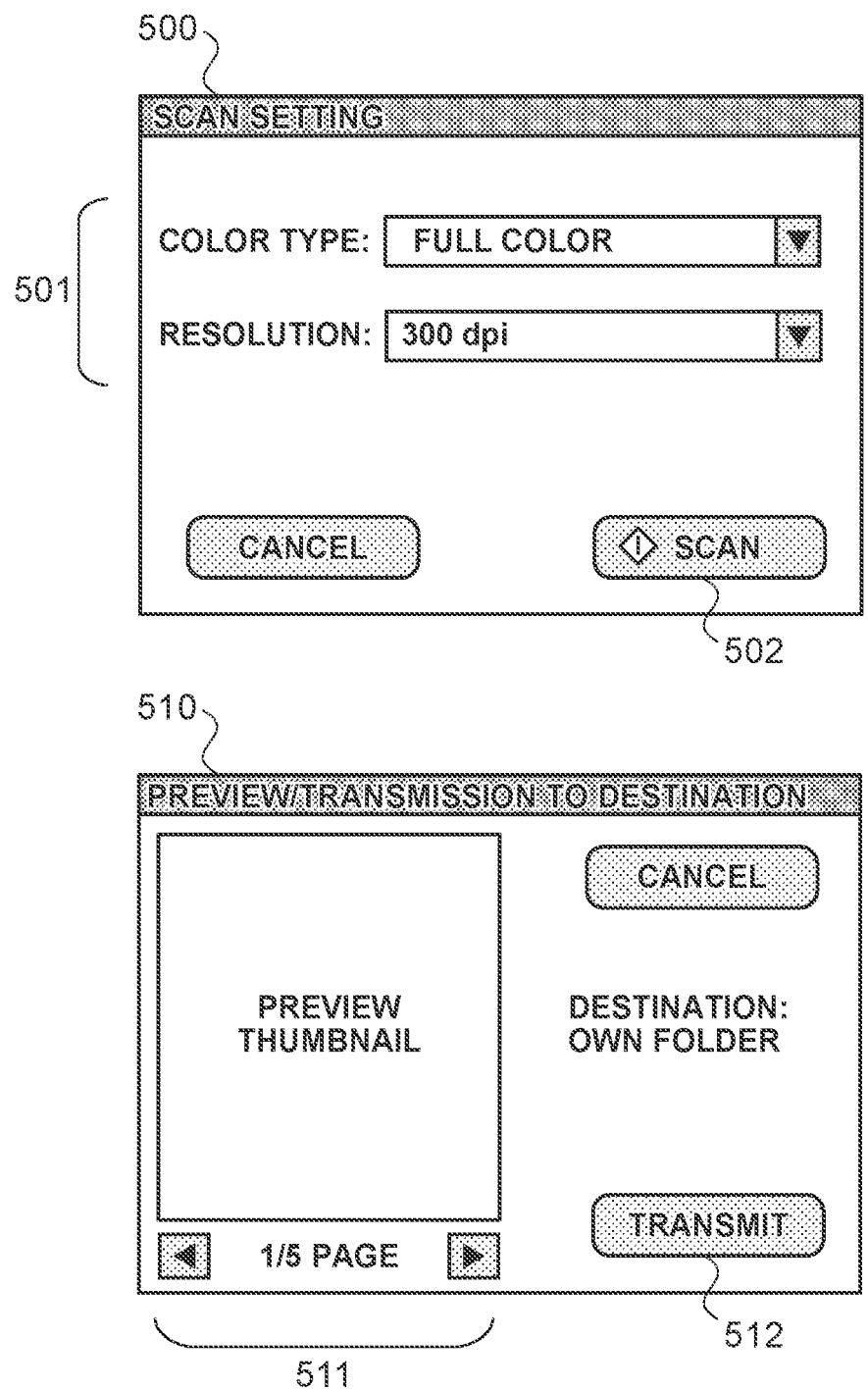
FIG. 5 is a second diagram illustrating the scan application UI.

FIGS. 4 and 5 are diagrams illustrating a UI of the scan application 352.

A login UI 400 includes a PIN input control 401 and a login execution button 402. The scan application 352 transmits the input credentials to the authentication application 315. After the login is successful, a scan application UI is displayed on a display unit of the scanner terminal 131. In the present exemplary embodiment, an example using the PIN as the credentials is described. However, this is not seen to be limiting, and other credentials, for example, a combination of the user ID and the password can be used. When the authentication processing is successful, the UI can transition from the login UI 400 to a UI 410. In a case where the scanner terminal 131 is a multifunctional peripheral including a print function and the like, a menu screen (not illustrated) displaying a list of functions provided by the multifunctional peripheral can be displayed, and the UI 410 can be displayed in response to selection of the scan function on the menu screen.

A UI 410 is a UI for selecting a transmission destination of a scanned document. The UI 410 includes a button control 411 to select a destination. When the user selects one of the transmission destinations provided by the button control 411, the UI transitions to UI 500 described below.

A UI 500 is a UI for changing scan setting. The UI 500 includes a selection control 501 to change scan setting values such as a color type and resolution and a Scan button 502 to start scanning. When the Scan button 502 is selected, the scanner terminal 131 reads a document using an optical scanner and generates a scanned image for each page of the document.

A UI 510 is a UI for performing a preview and transmission to the selected destination. The UI 510 includes a control 511 to display and change a thumbnail image for preview and a transmission button 512. When the transmission button 512 is selected, the scan application 352 transmits the scan data to the scanned document processing application 311. The scanned document processing application 311 stores the received scan data in the scanned document storage unit 322. The scanned document processing application 311 stores the scan data in association with the user who performed login via the login UI 400. The scanned document processing application 311 stores information on the selected transmission destination. The scanned document processing application 311 registers the scan data in a processing waiting queue of the user in the scanned document job queue 323. A queue status is set to an OCR processing waiting state.

The OCR processing unit 332 acquires the processing waiting queue from the scanned document job queue 323. The OCR processing unit 332 acquires the scanned image stored in the scanned document storage unit 322, and performs the OCR processing on the scanned image. The OCR processing unit 332 stores a result of the OCR processing in the scanned document processing result storage unit 325. The OCR processing unit 332 changes the queue status of the scanned document job queue 323 to a user processing waiting state. At this point, the scanned document job is put into a preparation completion state, and the user can start processing of the scanned document job in the client application 351.

Figure 6:
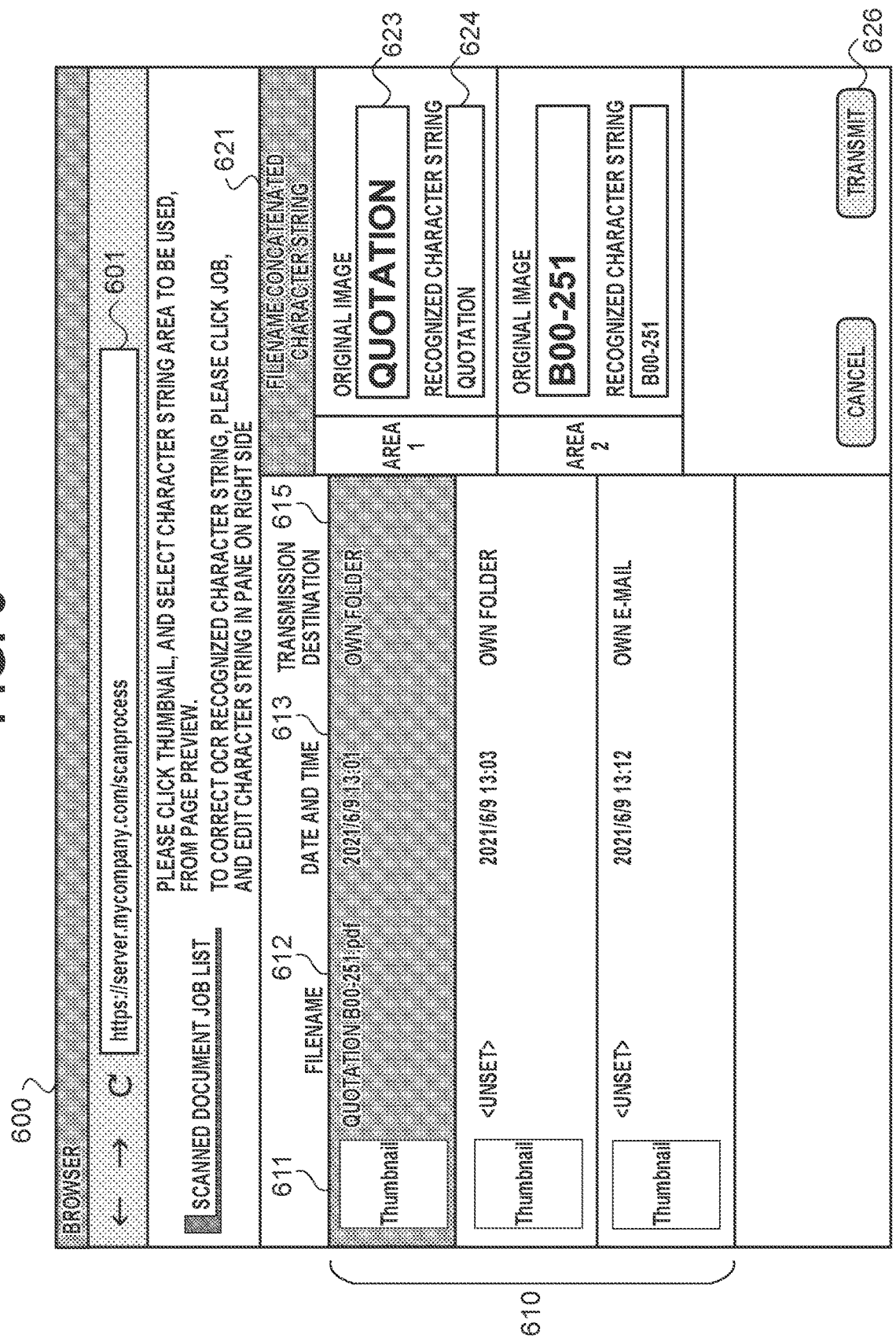
FIG. 6 is a first diagram illustrating a client application UI.

FIG. 6 is a diagram illustrating a UI of the client application 351.

A scanned document job list UI 600 includes a field 601 displaying the URL of the scanned document job list UI 600, a list view control 610 displaying a scanned document job list, a column 611 displaying a thumbnail of a cover page of a scanned document, a column 612 displaying a filename of the scanned document, a column 613 displaying a date and time when the scanned document job enters the preparation completion state, and a column 615 displaying a transmission destination of the scanned document. The client application 351 transmits a request to acquire the scanned document list of the user who has logged into the scanned document processing application 311. The scanned document processing application 311 acquires scanned document jobs in the user processing waiting state, from the scanned document job queue of the logged in user in the scanned document job queue 323, and returns the scanned document jobs to the client application 351. The client application 351 displays the received scanned document job list in the list view control 610. A proofreading UI pane 621 enables checking and correcting a filename concatenated character string. The proofreading UI pane 621 includes an image 623 of a character string area extracted by the OCR processing and an input control 624 to display and correct an OCR recognition result character string. A transmission button 626 will be described below.

Figure 7:
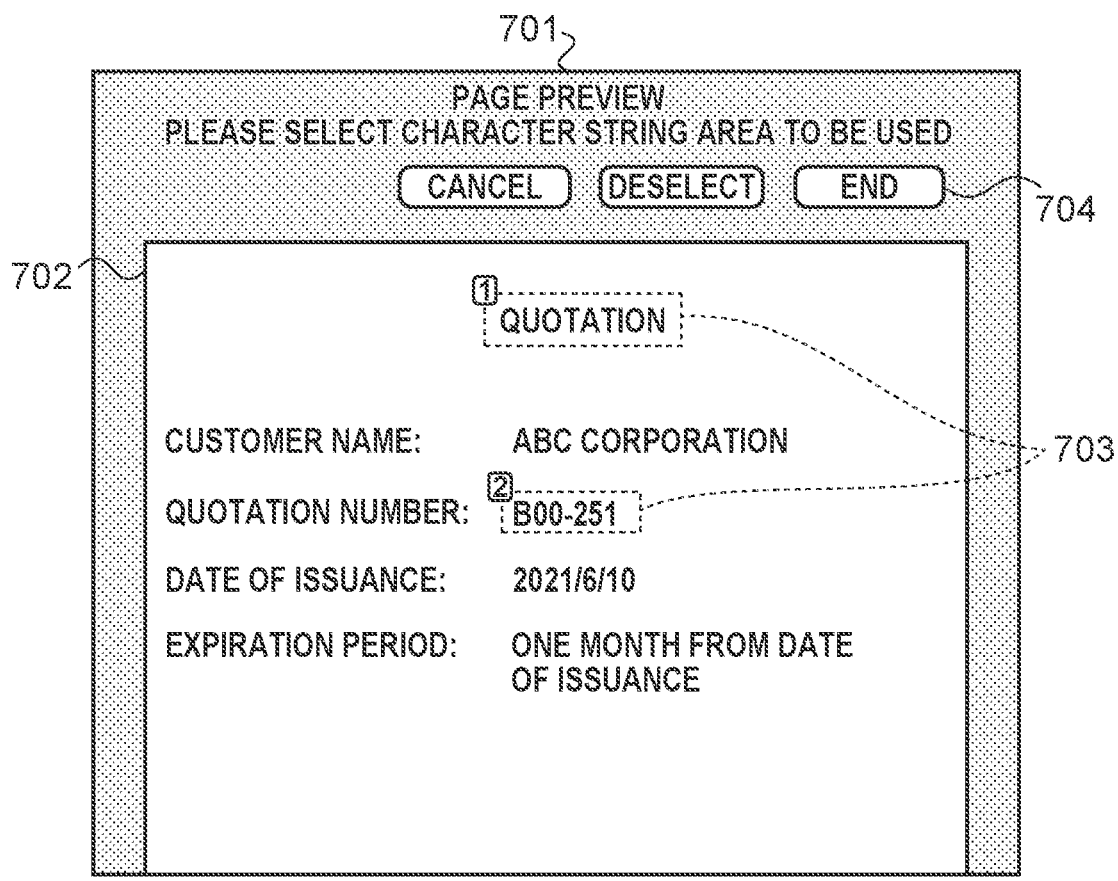
FIG. 7 is a second diagram illustrating the client application UI.

FIG. 7 illustrates a UI for page preview of a scanned image and for selection of character string areas.

A page preview UI 701 includes a page preview image 702, a character string area 703 used for the above-described concatenated character string (621), and a selection completion button 704. When a link embedded in the thumbnail 611 is selected in the list view control 610, the page preview UI 701 is opened.

Reference numeral 711 denotes an image for explaining character string areas extracted by the OCR processing. An enclosure line 712 indicates the character string area extracted by the OCR processing. As a result of extraction of areas where the character string recognized by the OCR processing is present, from the scanned image, a plurality of independent character string areas 712 in the image 711 (rectangular areas illustrated by dashed lines in image 711) becomes selectable candidates. In the page preview UI 701, the enclosure line is only displayed when a mouse pointer hovers above the character string area 712, thereby indicating the selectable area. The user selects one or more character string areas to be used for the filename concatenated character string in the page preview UI 701, and then selects the completion button 704 to reflect a selection result on the proofreading UI pane 621. Each of the selected character string areas is highlighted by the enclosure line with a tooltip enabling discrimination of, for example, a selected character string area 703 of numbers "1", "2", and the like.

By using the selected character string areas, one or more recognition result character strings are acquired from the OCR result and are concatenated. The concatenated character string is set as a filename of the scanned document. As a result, the filename named by the concatenated character string is displayed as the filename 612. The user compares and reviews the image 623 of a character string area and the OCR recognition result character string 624. In a case where correction is necessary, the user corrects the character string 624. When a transmission button 626 is selected, transmission to the destination is requested from the client application 351 to the scanned document processing application 311. The scanned document processing application 311 stores the set filename in the scanned document processing result storage unit 325. The scanned document processing application 311 changes the queue status of the scanned document job queue 323 to a transmission processing waiting state. The external system communication unit 334 acquires the processing waiting queue in the scanned document job queue 32. The external system communication unit 334 acquires the scan data from the scanned document storage unit 322, and acquires the transmission destination and the set filename from the scanned document processing result storage unit 325. The external system communication unit 334 transmits the set filename to the destination such that the set filename becomes a storage filename of the external storage. The queue status of the scanned document job queue 323 has a lifecycle of a newly-registered state, the OCR processing waiting state, the user processing waiting state, the transmission processing waiting state, and a deleted state in order.

A use case of the present exemplary embodiment will now be described. More specifically, the web application server 111 and the client application 351 perform the work of proofreading the OCR result of the scanned document and transmitting the OCR result to the destination.

FIG. 8 is a diagram illustrating a scanned document job notification method. An example in which an e-mail is used as the notification method and the notification reception application 355 serves as an e-mail client is described.

A reception box 800 of the user for e-mail addresses includes an e-mail list 801 of received scanned document job notifications. The reception box 800 is displayed on the user interface 201 of the client terminal 121.

Reference numeral 810 denotes an example of a body of the e-mail. As with the reception box 800, the body of the e-mail 810 is displayed on the user interface 201 of the client terminal 121. The body of the e-mail 810 includes a login URL 811 including a one-time token for login to the web application server 111. The login URL 811 includes a query string "otp" and a value thereof, and a query string "redirectto" and a value thereof. The query string "otp" indicates a one-time password. In the present exemplary embodiment, the one-time password is hereinafter referred to as a "one-time token". The definition, however, of the one-time token is the same as the definition of the common one-time password. In other words, the one-time token indicates credentials temporarily issued with an expiration date, which is usable for user authentication. The one-time password issued by token hardware or token software typically has a format that is relatively easily input and handled by a user, such as for example, a six-digit number. In a case where the one-time password is provided to the user by being embedded in the URL or the like, a random character string is desirably used in order to secure uniqueness and a security level of the one-time password. Examples of the format include a format like "745b4fb1a6d54b0a9370e2a8b23be7e1" in the login URL 811. The term "token" generally has a meaning of a communication identifier handled by a computer. Therefore, in the present exemplary embodiment, the random character string with a long character string length is referred to as the one-time token.

The query string "redirectto" designates a URL path of a web UI redirected after the login is successful. The redirect indicates automatic transfer from a certain URL to another URL. In the present exemplary embodiment, after the login is successful, the URL is redirected from the authentication application 315 to the URL of the web UI 313 of the scanned document processing application 311, and the scanned document job list UI 600 is displayed. This is the same as a path "scanprocess" of the URL 601.

In the scanned document processing work described in the present exemplary embodiment, after the OCR processing is completed, preparation of the scanned document job is completed, and the user can start the work, a notification is transmitted. This is a notification to quickly start, after the user ends the scan execution in the scanner terminal 131, the subsequent scanned document processing such as proofreading and transmission of the OCR result to the destination in the client application 351. The e-mail body incudes the login URL 811 with a one-time token. Therefore, when the user opens the login URL after receiving the e-mail, the user can quickly start the work by using the scanned document processing application 311. When the user performs login from the login URL, the URL is redirected to the URL of the web UI 313 of the scanned document processing application 311, and the scanned document job list UI 600 is displayed on the client terminal 121.

Since the URL includes the one-time token, the described URL is different for each e-mail. However, all of the URLs are redirected to the URL of the web UI 313 of the scanned document processing application 311. Therefore, even in a case where a plurality of e-mail notifications is received, the scanned document job list screen (FIG. 6) is displayed by accessing the login URL of any one of the e-mails, and the work can be started.

A login method using the one-time token and a management method will be described with reference to Table 1.

As described above, after the OCR processing of the scan data is completed and the queue status of the scanned document job queue 323 transitions to the "user processing waiting state", the authentication application 315 newly generates a one-time token in the token data 328 (Table 1).

TABLE 1

| One-Time Token Management Data Store | | | | |
|---|---|---|---|---|
| User ID | One-Time Token | Date of Issuance | Expiration Period (min.) | State |
| User A | 745b4fb1a6d54b0a9370e2a8b23be7e1 | 2021-06-09T13:01:22.356 | 60 | Used |
| User A | d9bc215a4f7b32e91ab69929d4b092d | 2021-06-09T13:03:01.980 | 60 | Unused |
| User A | 1c5743592e224280b4b9f6947aaa1615 | 2021-06-09T13:12:35.218 | 60 | Unused |

In Table 1, the one-time token "745b4fb1a6d54b0a9370e2a8b23be7e1" is the same as the value of the query string "otp" in the login URL 811. The user opens the login URL 811 in the notification in the client application 351. The client application 351 transmits an HTTP request including the login URL 811 to the authentication application 315. The authentication application 315 verifies whether the query string "otp" of the URL in the received HTTP request matches any of the issued one-time token in the one-time token management data store of Table 1. In a case where the matching one-time token is present, the authentication application 315 verifies whether the "state" of the matching one-time token in Table 1 is an unused state, whether a current date and time does not exceed the expiration period of the matching one-time token, and whether the user ID is present as the valid user in the user data 326. When the verification is successful, the authentication application 315 issues the authentication session, and stores the authentication session in the authentication session data 327.

The "user ID" in Table 1 is associated with an e-mail address of a user managed by the user data 326. The e-mail address is used to notify the client terminal 121 of the URL including "one-time token" in Table 1.

Table 2 illustrates the authentication session data store.

TABLE 2

Authentication Session Data Store

| Session ID | User ID | Date of Issuance | Expiration Period (min.) | State |
|---|---|---|---|---|
| db5ee697-d671-4695-91df-950edbf95bb5 | User A | 2021-06-09T13:02:35.292 | 1440 | Authenticated |

After the URL is verified, the authentication application 315 returns a response indicating successful login to the client application 351. The response includes a session ID. The client application 351 stores the session ID in a local storage of the application. Thereafter, when the client application 351 accesses the URL of the scanned document processing application 311, the session ID is set to a cookie of the HTTP request. The scanned document processing application 311 verifies whether the session ID in the request is valid by collating the session ID with the authentication session data 327 (Table 2). In a case where the verification of the session ID is successful, the client application 351 can continuously access the scanned document processing application 311 as the user ID "user A" associated with the session ID.

An explanation regarding the contents of Table 1 and the scanned document job notification list 801 will be now be provided with respect to the scanned document processing work of the present exemplary embodiment. The scanned document processing work according to the present exemplary embodiment addresses risks associated with user scanning operations. More specifically, a user performing a plurality of scanning operations in a short timeframe results in generating a plurality of scanned document jobs. When a one-time token is issued at a timing when the status of each of the scanned document jobs is changed to a user processing waiting state, a plurality of one-time tokens is generated as illustrated in Table 1. In addition, as illustrated in the scanned document job notification list 801, a plurality of URL notifications, each with a one-time token, is transmitted.

When the user logs into the web application server 111 using the one-time token beginning with "745b4f", the remaining two one-time tokens in Table 1 are still in the unused state. FIG. 9 to FIG. 14 illustrate the present exemplary embodiment's method of addressing risks, such as improper login and data theft, that may occur when one-time tokens remain in the unused state FIG. 9 is a flowchart illustrating one-time token generation processing.

In step S901, preparation of the scanned document job is completed, and the user can start the scanned document processing. In step S902, the authentication application 315 generates a one-time token[n] for the user who is an owner of the scanned document job, and stores the one-time token[n] in the token data 328. In step S903, queries of the issued one-time tokens in the token data 328 are performed under an AND condition of all of the following conditions:

One-time token is issued to a user that is the same as the user of the scanned document job in step S901

Date of issuance is within a certain time from a date of issuance of the one-time token[n] (e.g., 60 minutes)

State is unused state

In step S904, it is determined whether a one-time token hit on the query is present.

In a case where a result of the determination in step S904 is YES, a one-time token[m] hit on the query and the one-time token[n] are added to the same one-time token management group[p]. In a case where the one-time token management group[p] is absent, the one-time token management group[p] is newly created. At this time, the one-time token management data store is recorded as illustrated in Table 3. When a management group identifier is added, different one-time tokens can be associated and grouped. The one-time tokens having a common management group identifier are handled as one-time tokens belonging to the same group. When a state of one of the one-time tokens belonging to the same group is changed to the "used" state, the states of all other one-time tokens belonging to the same group are changed to the "used" state.

TABLE 3

One-Time Token Management Data Store

| User ID | One-Time Token | Date of Issuance | Expiration Period (min.) | Management Group Identifier | State |
|---|---|---|---|---|---|
| User A | 745b4fb1a6d54b0a9370e2a8b23be7e1 | 2021-06-09T13:01:22.356 | 60 | 1bd991ff-78ae-4b7f-8069-f6a0fe443f44 | Used |
| User A | d9bc215a4f7b432e91ab69929d4b092d | 2021-06-09T13:03:01.980 | 60 | 1bd991ff-78ae-4b7f-8069-f6a0fe443f44 | Used/Reason: token in same group is used |
| User A | 1c5743592e224280b4b9f6947aaa1615 | 2021-06-09T13:12:35.218 | 60 | 1bd991ff-78ae-4b7f-8069-f6a0fe443f44 | Used/Reason: token in same group is used |

In step S906, the notification processing unit 335 transmits the issued login URL with a one-time token to the notification reception application 355. The processing then ends.

Figure 10:
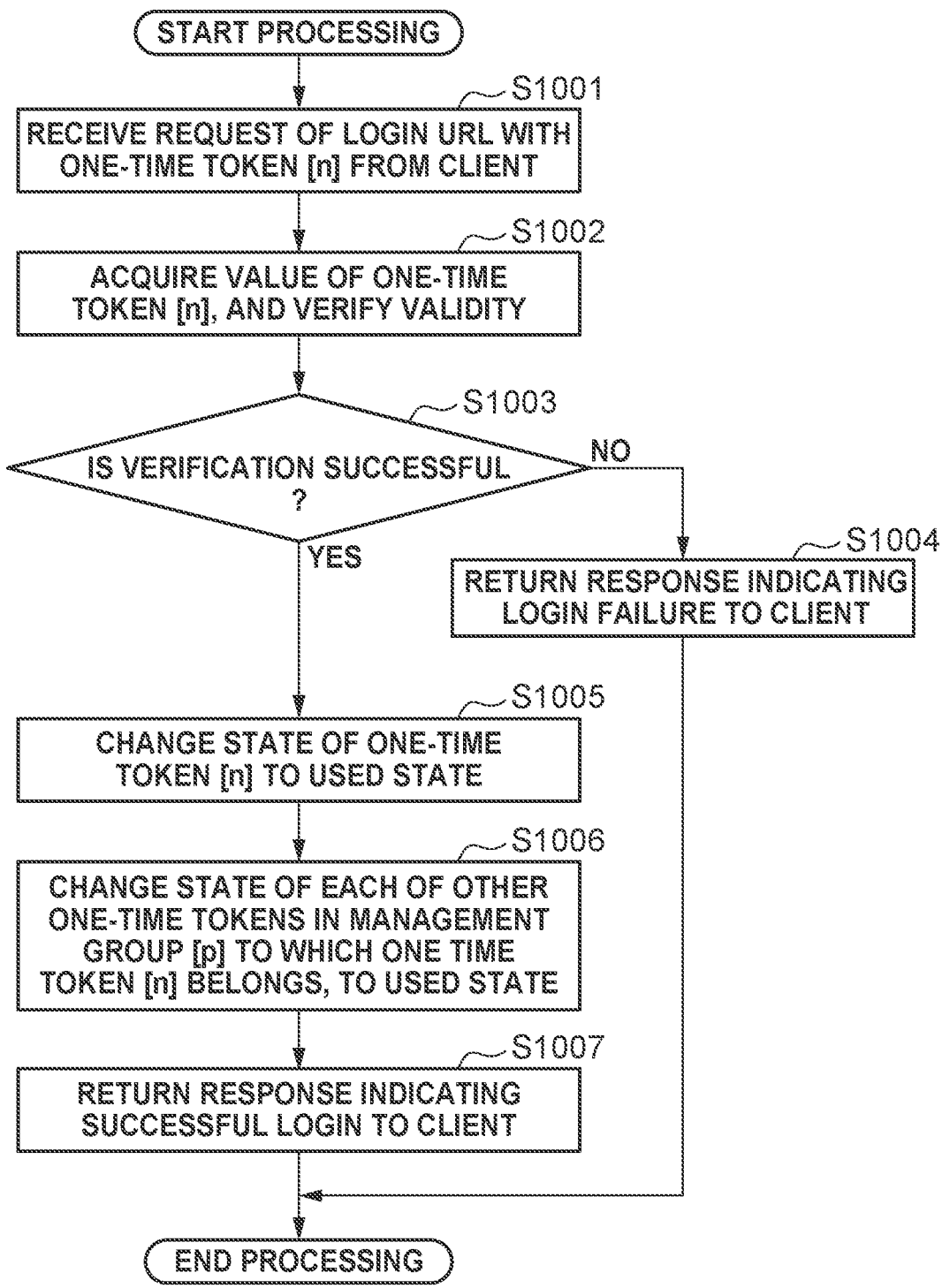
FIG. 10 is a flowchart illustrating one-time token state changing processing.

FIG. 10 is a flowchart illustrating processing to change the state of the one-time token to the "used" state.

When the user opens the login URL 811 via the client application 351, a login request is transmitted to the authentication application 315. The processing in FIG. 10 is initiated by transmission of the login request.

In step S1001, the authentication application 315 receives the request. In step S1002, the authentication application 315 acquires a value of the one-time token from the query string of the login URL of the request. The authentication application 315 verifies whether the acquired one-time token matches any of the issued one-time tokens in the one-time token management data store. In a case where the matching one-time token is present, the authentication application 315 verifies whether the state of the matching one-time token is the unused state, and whether the current date and time does not exceed the expiration period of the matching one-time token. In step S1003, a result of the verification in step S1002 is determined. In a case where the result of the verification in step S1003 is NO, the authentication application 315 returns a response indicating login failure to the client application 351 in step S1004. The processing then ends. In place of the response indicating login failure, the authentication application 315 can redirect the URL to the normal login screen to prevent notification of authentication failure.

In a case where the result of the verification in step S1003 is YES, the authentication application 315 changes the state of the one-time token[n] to the "used" state in step S1005. Next, in step S1006, the authentication application 315 changes the state of each of the other one-time tokens in the management group[p] to which the one-time token[n] belongs to the "used" state. At this time, use of the token in the same group is recorded, as illustrated in Table 3, as the reason why the state is changed to the "used" state. This is to distinguish the one-time token[n] actually used for the login request from the other tokens not used but the states of which have been changed to the used state due to use of the token in the same group. The processing in FIG. 10 then ends.

As described above, the one-time tokens issued to the same user retroactive to the certain time period are grouped together. As a result, when one one-time token in the group is used, it is possible to change the states of all the other one-time tokens in the group to the unused state. This enables preventing, when the plurality of one-time tokens is issued, unnecessary one-time tokens from remaining as the unused one-time tokens after one time of login, and to maintain security similar to a one-time token that is advantageous in single use.

In the present exemplary embodiment, the use case where, when the user needs to perform login in the processing flow of the scanned document processing work, the one-time token is issued and the user performs login using the one-time token is described as an example. However, the exemplary embodiment is not limited to this use case. In another applicable use case, the one-time token is issued when a user action or system trigger action of some kind occurs in the processing flow.

A second exemplary embodiment will now be described. A scanned document job automatic dividing function is present as a function provided by the scan application 352 or the scanned document processing application 311. The automatic dividing function is a function of dividing, when a document including a plurality of pages is scanned, scan data on the document in units of page or the like, and storing a plurality of pieces of scan data instead of one piece of scan data. When the scan data on the document is stored as the plurality of pieces of scan data, each piece of the scan data is displayed as independent scan data in the scanned document job list 610 in FIG. 6, and is processed. The scan data can be divided, for example, in units of some pages or by handling a page in which a specific barcode or a quick response (QR) Code® is detected as a head page, where the unit that scan data is divided in is not seen to be limiting.

For example, it is assumed that a document including 10 sheets is divided into 10 scanned document jobs by the automatic dividing function. When preparation of the scanned document jobs is completed, 10 one-time tokens are generated for the 10 scanned document jobs and are notified, as illustrated in FIG. 10. This scenario can lead to a situation, where generation of the one-time token and notification of the one-time token by email are to be suppressed.

Figure 11:
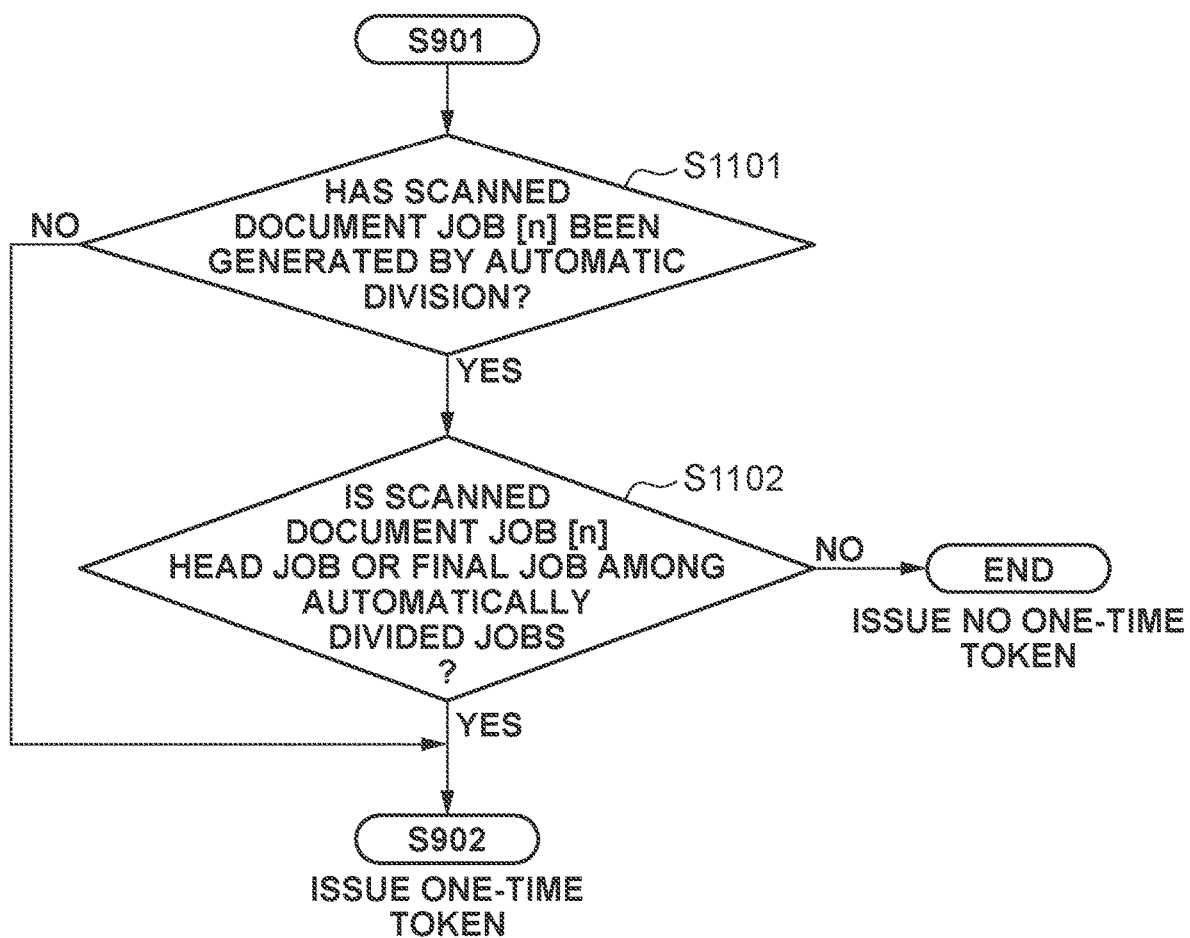
FIG. 11 is a flowchart illustrating automatic dividing determination processing.
Figure 12:
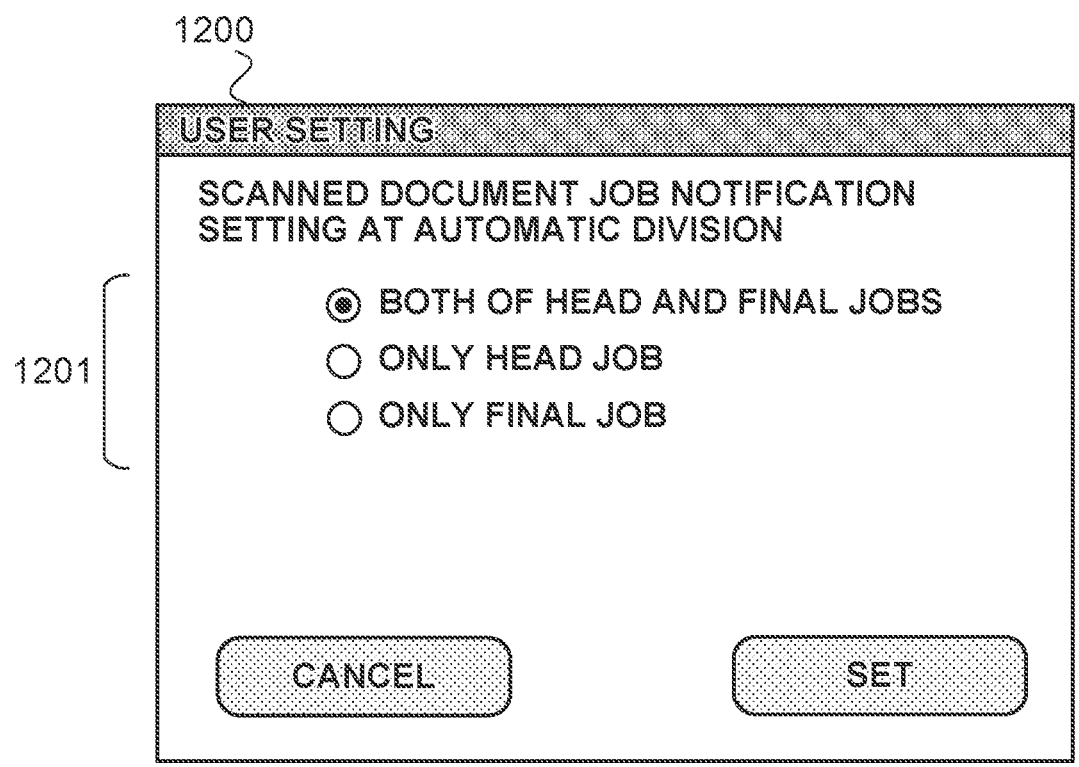
FIG. 12 is a diagram illustrating a notification setting UI.

FIGS. 11 and 12 illustrate a process for addressing this situation.

FIG. 11 is a flowchart illustrating automatic dividing determination processing.

After preparation of the scanned document job[n] is completed in step S901, the authentication application 315 determines whether the scanned document job[n] has been generated by the automatic dividing function, in step S1101. In a case where a result of the determination in step S1101 is NO, the processing proceeds to step S902, where a one-time token is issued. In a case where the result of the determination in step S1101 is YES, flow proceeds to step S1102, where the authentication application 315 determines whether the scanned document job[n] is a head job or a final job from among the automatically divided jobs. In a case where a result of the determination in step S1102 is NO, no one-time token is issued and the processing ends. In a case where the result of the determination in step S1102 is YES, the processing proceeds to step S902, where a one-time token is issued.

A method of setting the notification setting for each user when the job is automatically divided will be described with reference to a UI illustrated in FIG. 12.

A notification setting UI 1200 that is used for a case where the job is automatically divided is a screen provided by the web UI 317 of the authentication application 315. A radio button 1201 enables selecting a notification timing. When one of the items provided by the radio button 1201 is selected, it is possible to notify, by e-mail, both of the head scanned document job and the final scanned document job, just the head scanned document job, or just the final scanned document job, from among the automatically divided scanned document jobs.

The notification timing for each user can be selected and set by using the notification setting UI 1200. With reference to the setting, the determination condition in step S1102 is overridden with the contents selected by the radio button 1201, the one-time token is generated and notified under the condition selected by the radio button 1201. The processing contents in step S1102 in FIG. 11 are also changed based on the radio button 1201 item that is selected.

As described above with reference to FIGS. 11 and 12, in the case where the plurality of scanned document jobs is generated by the automatic dividing function and processed in an extremely short time, the number of issued one-time tokens is suppressed to prevent a large number of one-time tokens from being unnecessarily issued and notified.

The above-described scanned document processing work also includes a job delegation function, which will now be described. The login processing by the one-time token in a case of a delegated scanned document job will also be described.

FIG. 13 is a diagram illustrating a scanned document job delegation notification method. Reference numeral 1300 denotes a body of an e-mail of the scanned document job delegation notification. The body of the e-mail includes a login URL 1301. A user who has performed the login via the scan application 352 and has transmitted scan data during the login is an owner of the scanned document job. The user as the owner can delegate the subsequent scanned document processing work to another user.

TABLE 4

Delegated User Management Data

| Scanned Document Job ID | Owner User ID | Creation Date and Time | Delegated User ID | Delegation Date and Time |
|---|---|---|---|---|
| fd088cad-c6fb-4ce7-8bc1-ecc3379edf7a | User A | 2021-06-10T14:00:33.356 | User B | 2021-06-10T14:15:32.545 |

As illustrated in Table 4, when a user A delegates the scanned document job to a user B, the scanned document processing application 311 records the delegated user in the processing waiting queue of the scanned document job queue 323. When an assignment event of the delegated user occurs, the notification processing unit 335 transmits the scanned document job notification 1300 to the delegated user. At this time, issuance of a one-time token is not performed. In other words, the login URL 1301 in the scanned document job notification 1300 provided to the delegated user does not include a one-time token by the query string "otp". When the delegated user opens the login URL 1301 in the client application 351, a normal login screen (not illustrated) is displayed. Examples of the normal login screen include a screen for input of the user ID and the password. Other user authentication methods are also available.

By not issuing a one-time token to the delegated user, it is possible to prevent the delegated user from unconditionally accessing the scan data.

FIG. 14 is a flowchart illustrating processing to determine availability of the one-time token based on a role imparted to the user. Table 5 illustrates examples according to the present exemplary embodiment of roles that can be imparted on users. Table 6 illustrates an example according to the present exemplary embodiment of the roles defined in Table 5 being imparted to specific users.

TABLE 5

Role Definition Management Data

| Role | Access Target | Permitted Operation | Role with Management Authority |
|---|---|---|---|
| Entire Management Role | Entire System | Creation, Reading, Change, Deletion | Yes |
| User Management Role | User Management | Creation, Reading, Change, Deletion | Yes |
| General Role | Scanned Document Processing Application | Reading, Change, Deletion | No |

TABLE 6

User-Imparted Role Management Data

| User ID | Imparted Role |
|---|---|
| User A | Entire Management Role |
| User B | General Role |
| User C | User Management Role, General Role |

An entire management role is a role having management authority for the web application server 111. A user management role is a role having management authority for the user data 326. A general role is a role for use of the scanned document processing application 311 and not having management authority.

The management authority is a stronger authority enabling the user to change the setting of the web application server 111 or to add, change, or delete the user data 326. In the case of the general role, the user can use the scanned document processing application 311 from the client application 351, but the access is limited only to the own scanned document job.

In a case where a user C having the management role performs login from the scan application 352 and transmits a scanned image and a scanned document job is accordingly created, when the status of the scanned document job becomes the user processing waiting state, the scanned document job notification including the URL with a one-time token similar to the e-mail 810 is transmitted to an e-mail address of the user C. When the user C accesses the URL with the one-time token, the client application 351 transmits a login request to the authentication application 315. The authentication application 315 receives the request of the login URL with the one-time token (similar to step S1001). In step S1401, the authentication application 315 performs a query of the issued one-time token[n] to specify the user ID. In step S1402, the authentication application 315 performs a query of the user data 326 to specify a role imparted to the user ID of the one-time token[n]. In step S1403, the authentication application 315 determines whether at least one role having management authority is imparted to the user ID. In the present example, the management role is imparted to the user C. Thus a result of the determination in step S1403 is YES, and the processing proceeds to step S1404.

In step S1404, the authentication application 315 invalidates the one-time token[n], and returns the normal login screen to the client application 351. In a case where the result of the determination in step S1403 is NO, the processing proceeds to the one-time token verification in step S1002. The additional processing described with reference to the flowchart of FIG. 14 is an option disabling use of the one-time token when the one-time token is issued to a user having a stronger management authority. The option is advantageous in that, when the access is requested from the user having the strong management authority, the login by the one-time token is not permitted and the normal user authentication is requested. In the present exemplary embodiment, the one-time token enables the user having the general role to quickly log into the scanned document processing application. This is because the access range of the user having the general role is limited such that the user can only access the own scanned document job in the scanned document processing application. In the case of the user having the strong management authority, the normal user authentication is requested on the screen other than the scanned document processing application and operation after login, which makes it possible to maintain security.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been discussed, these embodiments are not seen to be limiting. The scope of the following claims is to be accorded the broadest interpretation so as to encompass all such modifications and equivalent structures and functions.

This application claims the benefit of Japanese Patent Application No. 2021-132249, filed Aug. 16, 2021, which is hereby incorporated by reference herein in its entirety.

What is claimed is:

1. A server configured to verify a token acquired from an information processing apparatus, the server comprising:
at least one memory; and
at least one processor that executes a program stored in the memory to:
issue a token to a user each time a request is received from the user, wherein a first token and a second token and a third token are tokens issued in response to the request from the user;
identify an unused token that is issued within a past predetermined time after a date and time of issuing the third token from among tokens issued to the user and associate the identified unused token with the third token, after issuing the third token, wherein the first token and the second token and the third token are associated with each other; and
invalidate, when the first token is received from the information processing apparatus, the second token and the third token managed in association with the first token.

2. The server according to claim 1, further comprising transmitting an electronic mail including a uniform resource locator (URL) that includes an issued token to the information processing apparatus.

3. The server according to claim 2, further comprising acquiring scan data from an apparatus and providing a service relating to the scan data, wherein the service is provided to the information processing apparatus when the information processing apparatus accesses the URL.

4. The server according to claim 3, wherein, when the information processing apparatus accesses the URL, an access destination by the information processing apparatus is transferred to the service.

5. The server according to claim 3, wherein the information processing apparatus displays information about the scan data when accessing the URL.

6. The server according to claim 2, wherein a first electronic mail is transmitted to the information processing apparatus in which a first URL including the first token is included, and wherein a second electronic mail is transmitted to the information processing apparatus in which a second URL including the second token is included.

7. The server according to claim 6, further comprising setting whether to transmit one or both of the first electronic mail and the second electronic mail.

8. The server according to claim 6, wherein information about scan data displayed in response to accessing the first URL and information about scan data displayed in response to accessing the second URL are identical.

9. The server according to claim 6, wherein, when scan data is transmitted to the server, information about a user logging into an apparatus and an electronic mail address as a transmission destination of the first URL and the second URL are managed in association with each other.

10. The server according to claim 1, wherein each of the issued tokens has a set expiration period.

11. The server according to claim 1, further comprising providing a service relating to scan data,
wherein the information processing apparatus logs into the service using any issued tokens.

12. The server according to claim 1, wherein, invalidating the second token includes changing information indicating a state of the second token to indicate that the second token has been used.

13. A method for controlling a server that verifies a token acquired from an information processing apparatus, the method comprising:
issuing a token to a user each time a request is received from the user, wherein a first token and a second token and a third token are tokens issued in response to the request from the user;
identifying an unused token that is issued within a past predetermined time after a date and time of issuing the third token from among tokens issued to the user and associating the identified unused token with the third token, after issuing the third token, wherein the issued first token and the issued second token and the third token are associated with each other; and
invalidating, when receiving the first token from the information processing apparatus, the second token and the third token managed in association with the first token.

14. A non-transitory computer-readable storage medium that stores a program for causing a server that verifies a token acquired from an information processing apparatus to execute a method, the method comprising:
issuing a token to a user each time a request is received from the user, wherein a first token and a second token and a third token are tokens issued in response to the request from the user;
identifying an unused token that is issued within a past predetermined time after a date and time of issuing the third token from among tokens issued to the user and associating the identified unused token with the third token, after issuing the third token, wherein the issued first token and the issued second token and the third token are associated with each other; and invalidating, when receiving the first token from the information processing apparatus, the second token and the third token managed in association with the first token.

* * * * *